(12) United States Patent
Rashkovskiy et al.

(10) Patent No.: US 10,219,044 B2
(45) Date of Patent: Feb. 26, 2019

(54) ELECTRONIC PROGRAMMING GUIDE WITH SELECTABLE CATEGORIES

(71) Applicant: Intel Corporation, Santa Clara, CA (US)

(72) Inventors: Oleg B. Rashkovskiy, Cupertino, CA (US); Ben S. Wymore, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 383 days.

(21) Appl. No.: 14/804,135

(22) Filed: Jul. 20, 2015

(65) Prior Publication Data

US 2015/0341702 A1 Nov. 26, 2015

Related U.S. Application Data

(60) Continuation of application No. 12/697,374, filed on Feb. 1, 2010, which is a division of application No.
(Continued)

(51) Int. Cl.
*G06F 3/0481* (2013.01)
*H04N 21/482* (2011.01)
(Continued)

(52) U.S. Cl.
CPC ..... *H04N 21/4821* (2013.01); *G06F 3/04817* (2013.01); *G06F 3/04842* (2013.01);
(Continued)

(58) Field of Classification Search
CPC .. G06F 3/04812; G06F 3/0484; G06F 3/0487; G06F 3/04842; H04N 21/482;
(Continued)

(56) References Cited

U.S. PATENT DOCUMENTS 5,602,729 A 2/1997 Krueger
5,621,456 A * 4/1997 Florin .................. H04N 5/4403
348/E5.103
(Continued)

FOREIGN PATENT DOCUMENTS

JP H08289219 11/1996

OTHER PUBLICATIONS

Office Action dated Oct. 6, 2017 in U.S. Appl. No. 14/804,135, and related attachments.
(Continued)

*Primary Examiner* — Steven P Sax
(74) *Attorney, Agent, or Firm* — Christopher K. Gagne

(57) ABSTRACT

An electronic content guide may organize content such as television programs into categories and subcategories. The categories and subcategories may be topical as well as time-based. As a result, the user can select a given time-based criteria and within that time-based criteria select topical subcategories. As a result, the number of programs that may be displayed in any given graphical user interface may be reduced to a manageable level. This may be done without requiring a great deal of scrolling to view selected categories, subcategories and particular programs.

12 Claims, 7 Drawing Sheets

Related U.S. Application Data

10/641,179, filed on Aug. 14, 2003, now Pat. No. 7,685,520, which is a division of application No. 09/599,242, filed on Jun. 22, 2000, now abandoned.

(51) Int. Cl.

| | | |
|---|---|---|
| *G06F 3/0484* | (2013.01) | |
| *H04N 5/445* | (2011.01) | |
| *H04N 21/443* | (2011.01) | |
| *H04N 21/45* | (2011.01) | |

(52) U.S. Cl.
CPC ..... *H04N 5/44543* (2013.01); *H04N 21/4438* (2013.01); *H04N 21/4532* (2013.01); *H04N 21/482* (2013.01); *H04N 21/4828* (2013.01)

(58) Field of Classification Search
CPC ............. H04N 12/581; H04N 21/4438; H04N 21/4532; H04N 21/4821; H04N 21/4828
See application file for complete search history.

(56) References Cited

U.S. PATENT DOCUMENTS

| | | | |
|---|---|---|---|
| 5,621,876 A | 4/1997 | Odam | |
| 5,724,065 A | 3/1998 | Chang | |
| 5,745,891 A | 4/1998 | Minakuchi | |
| 5,801,747 A | 9/1998 | Bedard | |
| 5,805,153 A | 9/1998 | Nielsen | |
| 5,805,161 A | 9/1998 | Tiphane | |
| 5,835,916 A | 11/1998 | Inaki | |
| 5,880,768 A * | 3/1999 | Lemmons | H04N 5/44543 348/E5.097 |
| 5,923,323 A | 7/1999 | Chiu | |
| 6,005,561 A | 12/1999 | Hawkins | |
| 6,008,802 A | 12/1999 | Iki | |
| 6,018,768 A * | 1/2000 | Ullman | H04L 29/06 348/E7.024 |
| 6,020,930 A | 2/2000 | Legrand | |
| 6,073,120 A | 6/2000 | Shiota | |
| 6,104,334 A * | 8/2000 | Allport | G06F 1/1626 340/12.28 |
| 6,141,003 A * | 10/2000 | Chor | H04N 5/44543 348/E5.104 |
| 6,144,375 A * | 11/2000 | Jain | G06F 17/30017 345/420 |
| 6,144,974 A | 11/2000 | Gartland | |
| 6,151,059 A | 11/2000 | Schein | |
| 6,163,316 A | 12/2000 | Killian | |
| 6,172,674 B1 | 1/2001 | Etheredge | |
| 6,172,677 B1 * | 1/2001 | Stautner | G06F 3/033 348/E5.105 |
| 6,177,931 B1 * | 1/2001 | Alexander | G06Q 30/0269 348/565 |
| 6,185,582 B1 | 2/2001 | Zellweger | |
| 6,195,089 B1 | 2/2001 | Chaney | |
| 6,205,453 B1 | 3/2001 | Tucker | |
| 6,205,485 B1 * | 3/2001 | Kikinis | H04H 20/28 348/14.03 |
| 6,230,321 B1 * | 5/2001 | Kim | H04N 5/4401 348/564 |
| 6,243,142 B1 | 6/2001 | Mugura | |
| 6,256,649 B1 | 7/2001 | Mackinlay | |
| 6,275,268 B1 * | 8/2001 | Ellis | A63F 13/12 348/564 |
| 6,317,750 B1 | 11/2001 | Tortolani | |
| 6,337,697 B1 | 1/2002 | Kim | |
| 6,411,959 B1 | 6/2002 | Kelsey | |
| 6,388,714 B1 | 7/2002 | Schein | |
| 6,418,424 B1 | 7/2002 | Hoffberg | |
| 6,437,812 B1 | 8/2002 | Giles | |
| 6,445,398 B1 | 9/2002 | Gerba | |
| 6,452,611 B1 | 9/2002 | Gerba | |
| 6,462,752 B1 | 10/2002 | Ma | |
| 6,486,892 B1 | 11/2002 | Stern | |
| 6,492,997 B1 | 12/2002 | Gerba | |
| 6,496,981 B1 * | 12/2002 | Wistendahl | G11B 27/034 345/619 |
| 6,505,348 B1 | 1/2003 | Knowles | |
| 6,513,069 B1 * | 1/2003 | Abato | G06K 13/0825 709/218 |
| 6,522,342 B1 | 2/2003 | Gagnon | |
| 6,532,589 B1 | 3/2003 | Proehl | |
| 6,536,041 B1 | 3/2003 | Knudson | |
| 6,556,221 B1 | 4/2003 | Shima | |
| 6,583,795 B1 | 6/2003 | Ohyama | |
| 6,614,457 B1 | 9/2003 | Sanada | |
| 6,665,869 B1 | 12/2003 | Ellis | |
| 6,690,401 B1 | 2/2004 | Stead | |
| 6,693,896 B1 * | 2/2004 | Utsumi | H04L 12/66 370/352 |
| 6,714,974 B1 * | 3/2004 | Machida | H04L 41/22 709/204 |
| 6,721,879 B1 | 4/2004 | Tanaka | |
| 6,721,953 B1 | 4/2004 | Bates | |
| 6,769,128 B1 | 7/2004 | Knee | |
| 6,782,505 B1 | 8/2004 | Miranker | |
| 6,839,903 B1 | 1/2005 | Shintani | |
| 6,857,128 B1 | 2/2005 | Borden | |
| 6,954,897 B1 | 10/2005 | Noguchi | |
| 6,980,131 B1 | 12/2005 | Taylor | |
| 6,990,676 B1 * | 1/2006 | Proehl | H04N 21/4622 725/40 |
| 6,990,677 B1 | 1/2006 | Pietraszak | |
| 7,003,792 B1 * | 2/2006 | Yuen | H04N 5/44543 348/E5.105 |
| 7,034,851 B1 | 4/2006 | Furui | |
| 7,120,871 B1 * | 10/2006 | Harrington | G09G 5/00 348/E7.061 |
| 7,143,428 B1 * | 11/2006 | Bruck | H04N 5/44543 725/37 |
| 7,150,029 B1 * | 12/2006 | Ebling | H04N 21/4147 725/39 |
| 7,155,667 B1 | 12/2006 | Kotler | |
| 7,284,033 B2 | 10/2007 | Jhanji | |
| 7,685,520 B2 | 3/2010 | Rashkovskiy | |
| 7,904,813 B1 * | 3/2011 | Takahashi | G11B 27/031 715/720 |
| 8,042,063 B1 | 10/2011 | Lin-Hendel | |
| 2001/0011364 A1 | 8/2001 | Stoub | |
| 2001/0019338 A1 | 9/2001 | Roth | |
| 2001/0056577 A1 | 12/2001 | Gordon | |
| 2002/0010926 A1 | 1/2002 | Lee | |
| 2002/0054062 A1 | 5/2002 | Gerba | |
| 2002/0054103 A1 | 5/2002 | Mizuno | |
| 2003/0005463 A1 * | 1/2003 | Macrae | H04N 5/4401 725/112 |
| 2003/0041116 A1 | 2/2003 | Jeyachandran | |
| 2004/0034867 A1 | 2/2004 | Rashkovskiy | |
| 2004/0125120 A1 | 7/2004 | Weiner | |
| 2005/0193337 A1 | 9/2005 | Noguchi | |
| 2006/0242666 A1 | 10/2006 | Alba | |
| 2010/0138790 A1 | 6/2010 | Rashkovskiy | |
| 2015/0326937 A1 | 11/2015 | Rashkovskiy | |
| 2015/0341702 A1 | 11/2015 | Rashkovskiy | |

OTHER PUBLICATIONS

Office Action dated Oct. 5, 2017 in U.S. Appl. No. 14/804,196, and related attachments.

Office Action dated Mar. 31, 2003 in U.S. Appl. No. 09/599,242, and related attachments.

Office Action dated Aug. 8, 2003 in U.S. Appl. No. 09/599,242, and related attachments.

Notice of Allowance dated Oct. 30, 2009 in U.S. Appl. No. 10/641,179, and related attachments.

Office Action dated Mar. 18, 2009 in U.S. Appl. No. 10/641,179, and related attachments.

Office Action dated Nov. 26, 2008 in U.S. Appl. No. 10/641,179, and related attachments.

(56) References Cited

OTHER PUBLICATIONS

Office Action dated Jun. 9, 2008 in U.S. Appl. No. 10/641,179, and related attachments.
Office Action dated Feb. 21, 2008 in U.S. Appl. No. 10/641,179, and related attachments.
Office Action dated Dec. 27, 2007 in U.S. Appl. No. 10/641,179, and related attachments.
Office Action dated Jul. 2, 2007 in U.S. Appl. No. 10/641,179, and related attachments.
Office Action dated Jun. 5, 2015 in U.S. Appl. No. 12/697,374, and related attachments.
Office Action dated Apr. 17, 2015 in U.S. Appl. No. 12/697,374, and related attachments.
Office Action dated Sep. 23, 2014 in U.S. Appl. No. 12/697,374, and related attachments.
Office Action dated Mar. 27, 2013 in U.S. Appl. No. 12/697,374, and related attachments.
Office Action dated Nov. 30, 2012 in U.S. Appl. No. 12/697,374, and related attachments.
Office Action dated Oct. 19, 2012 in U.S. Appl. No. 12/697,374, and related attachments.
Office Action dated Aug. 23, 2012 in U.S. Appl. No. 12/697,374, and related attachments.
Office Action dated Mar. 20, 2012 in U.S. Appl. No. 12/697,374, and related attachments.
Office Action dated Jan. 12, 2018 in U.S. Appl. No. 14/804,135, and related attachments.
Office Action dated Jan. 11, 2018 in U.S. Appl. No. 14/804,196, and related attachments.
Office Action dated Mar. 26, 2018 in U.S. Appl. No. 14/804,135, and related attachments.
Office Action dated Mar. 27, 2018 in U.S. Appl. No. 14/804,196, and related attachments.
Notice of Allowance dated Oct. 15, 2018 in U.S. Appl. No. 14/804,196.

\* cited by examiner

ELECTRONIC PROGRAMMING GUIDE WITH SELECTABLE CATEGORIES

This is a divisional of U.S. patent application Ser. No. 10/641,179, filed on Aug. 14, 2003, which is a divisional of U.S. patent application Ser. No. 09/599,242 filed on Jun. 22, 2000, now abandoned.

BACKGROUND

This invention relates generally to electronic programming guides (also known as electronic content guides) for facilitating the selection of programming for viewing.

Conventionally, electronic programming guides provide a graphical display of programs that are available for viewing on a given channel at given times. Conventional electronic programming guides include a grid display with times across the horizontal axis and channels across the vertical axis. Each program associated with a given channel at a given time may be selected by mouse clicking on the program description. Upon selection, the program is automatically tuned for viewing.

While such content guides provide many advantages, there are many who would prefer to find programming content using topical or category style listings. Thus, some electronic content guides provide listings for particular categories of content such as movies or sports. However, these content guides generally dispense with any type of time and channel organization and simply list all of the content available within a given category.

Because the number of available programs at any instance in time is increasing rapidly, there is a continuing need for better ways to organize and implement electronic programming guides. Moreover, existing grid based displays require extensive scrolling to view the full extent of available program listings in some cable and satellite systems, it is sometimes difficult to quickly realize all of the available program options.

Thus, there is a need for an electronic content guide that better organizes the available content for easier selection and viewing.

DETAILED DESCRIPTION

Figure 1:
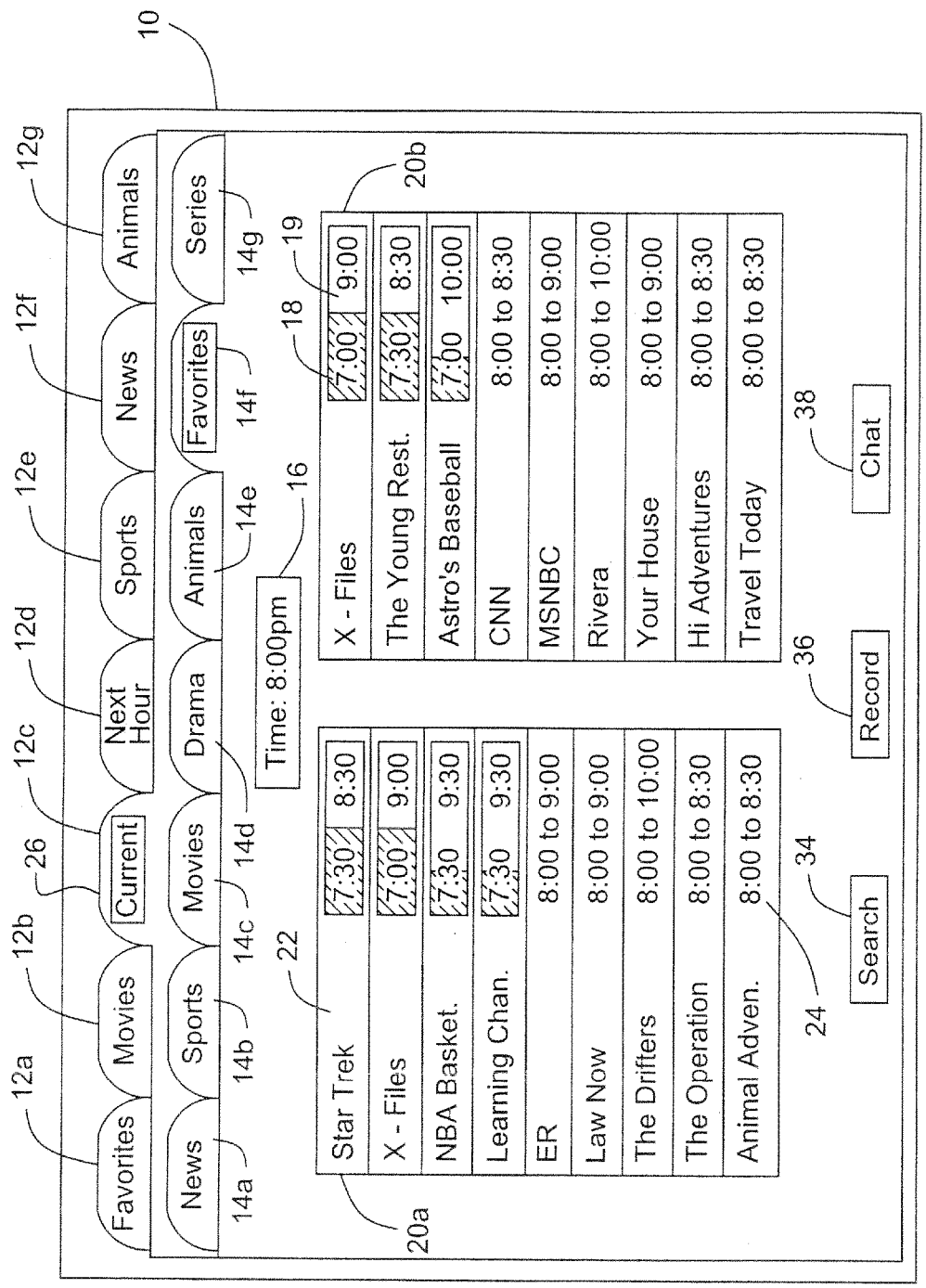
FIG. 1 is a view of a graphical user interface in accordance with one embodiment of the present invention.

Referring to FIG. 1, a graphical user interface 10 for implementing an electronic content guide includes a plurality of selectable category icons 12 represented as "virtual" file folders. Each category icon 12 may be predefined or may be user definable. Thus, in the embodiment illustrated in FIG. 1, category icon 12a is provided for favorite programs, 12b for movies, 12c for currently available programs, 12d for programs available in the next hour, 12e for sports programs, 12f for news and 12g for animal related content. Of course, the categorization of content is infinitely variable and a variety of different embodiments may be provided.

However, in some embodiments of the present invention, it is advantageous to organize the programming into both topical categories and time-based categories. Thus, the categories 12a, 12b, 12e, 12f and 12g are topical categories in that they relate to some characteristic of the program other than time. In contrast, the icons 12c and 12d select time-based categories, namely programs available now and programs available in an hour. Additional time-based categories may be provided to cover time periods further into the future.

In the embodiment illustrated in FIG. 1, the category icon 12c has been selected as indicated by the highlighting 26. A plurality of subcategory icons 14 are then displayed, for example as "virtual" file folders. Conventionally, each of the subcategory icons 14 may be displayed in association with a particular one of the category icons 12 such as the current icon 12c.

Thus, when the user selects currently available programs through the icon 12c, the user may thereafter select currently available news programs through the icon 14a, currently available sports through the icon 14b, currently available movies through the icon 14c, currently available drama series through the icon 14d, currently available animal programs through the icon 14e, currently available favorite programs through the icon 14f and currently available series through the icon 14g in one embodiment. Of course the variety of categorization within the icons 14 is highly variable.

One purpose of the category icons 14 may be to refine the amount of information that is displayed on a given graphical user interface. Another purpose may be to reduce the amount of information to an extent that the information is easily discernable in a single screen without excessive scrolling.

An icon 16 gives the current time. Thus, the current icon 12c selects content currently available at the time indicated by the icon 16.

In the illustration shown in FIG. 1, the user has selected the current icon 12c and the favorites subcategory icon 14f both of which are highlighted. Thus, the user has selected favorite programs that are currently available in the illustrated example. The basis for defining favorites may be extremely varied. The user may simply enter what the user decides at any given instance of time, such as any given day of the week, are his or her favorite programs. As another example, the system can automatically discern what are the favorite programs based on how frequently the user views a given program over varying time periods.

In the illustration shown in FIG. 1, a plurality of programs 22 are listed as entries in two columns 20a and 20b. These programs 22 are either currently in progress or just beginning, in keeping with the selection of currently available programs, through the icon 12c, and favorites among currently available programs through the selection of the icon 14f.

Thus, the X-Files program 22, runs from 7:00 to 9:00 as indicated by the indicia 18 and 19. The bar indicia 19 graphically indicates how much of the program has already been displayed or broadcast in the past using differently color indicia 18 and 19. Since the X-Files started at 7:00 and the current time is 8:00, the bar indicia 19 indicates that the program is half completed. Through the juxtaposition of the start time, indicated as 7:00, and the end time, indicated as 9:00, and the bar indicia 19, the user can determine the program timing and can determine how much of the program is left to view as indicated by the differently colored indicia 18.

Similarly, other programs include a bar type indicia 19 of the available time left in a given program and conversely the amount of the program that has already been missed. In the case of programs that are just starting at the current time (8:00) such as ER, no such graphical bar is provided since no portion of the program has been missed. To select a given program for viewing, the user simply clicks on the program listing 22 and the program is automatically displayed for viewing.

A plurality of additional icons may be provided such as a search icon 34, a record icon 36 and a chat icon 38. The search icon 34 brings up a graphical user interface that facilitates a keyword search through all the programs available through the graphical user interface 10. The keyword search may search through descriptive textual material stored in association with one or more programs.

The record icon 36 facilitates the recording of any program on the graphical user interface 10. In one embodiment of the present invention, the user can simply click on a given program and drag and drop it into to the record icon 36, to automatically cause a given program to automatically be recorded. The chat icon 38 may be selected after selecting a given program to automatically enter a chat room associated with a given program.

Figure 2:
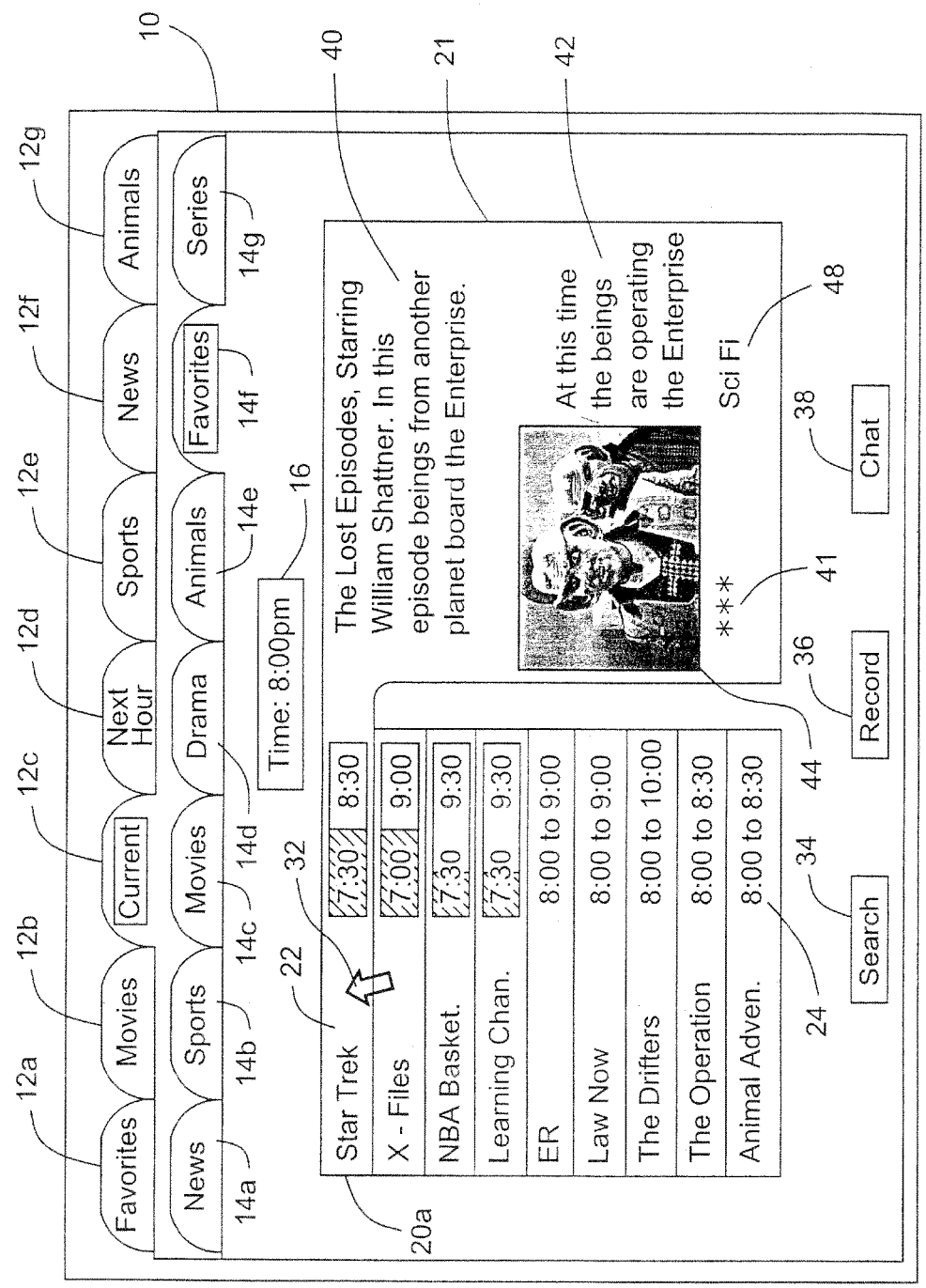
FIG. 2 is a view of a graphical user interface of FIG. 1 after a particular program has been selected for more information.

Turning next to FIG. 2, the user has mouse selected a program 22 as indicated by the positioning of the mouse cursor 32 over the entry 22. In response to selection of the entry 22, an expanded graphical user interface 21 is produced which overlays the column 20*b* (FIG. 1). The interface 21 provides additional information about the selected program entry 22. In this case, additional material 40 is given about the program in general. For example, the title of the program, the stars, and a description of the particular episode may be provided in the material 40. In addition, information may be provided about the current stage of the program. This information may include a video thumbnail 44 depiction of the current frame being displayed plus a description 42 of the particular stage of the program. For example, the description 42 may be provided for a particular chapter or other subdivision within the program 22. However, the description 42 may be even more timely, indicating what is currently going on at that instance in the given ongoing program.

In addition, the type of content associated with the program, such as science fiction, is indicated at 48. A star system 41 may also be provided to indicate the degree to which the program is one of the user's favorites. For example, based on the number of times that the user watches the series, a program in the series may be given a star rating 41 from one to four stars in one embodiment. This information may be helpful to the user in determining that in fact this program is the one that the user wishes to watch.

In some embodiments, the entries 22 may be ordered from top to bottom in each column 20 based on the frequency with which the user views the series that includes program represented by an entry 22. For example, the programs with the highest star rating 41 may be listed prominently at the top of the columns 20.

Figure 3:
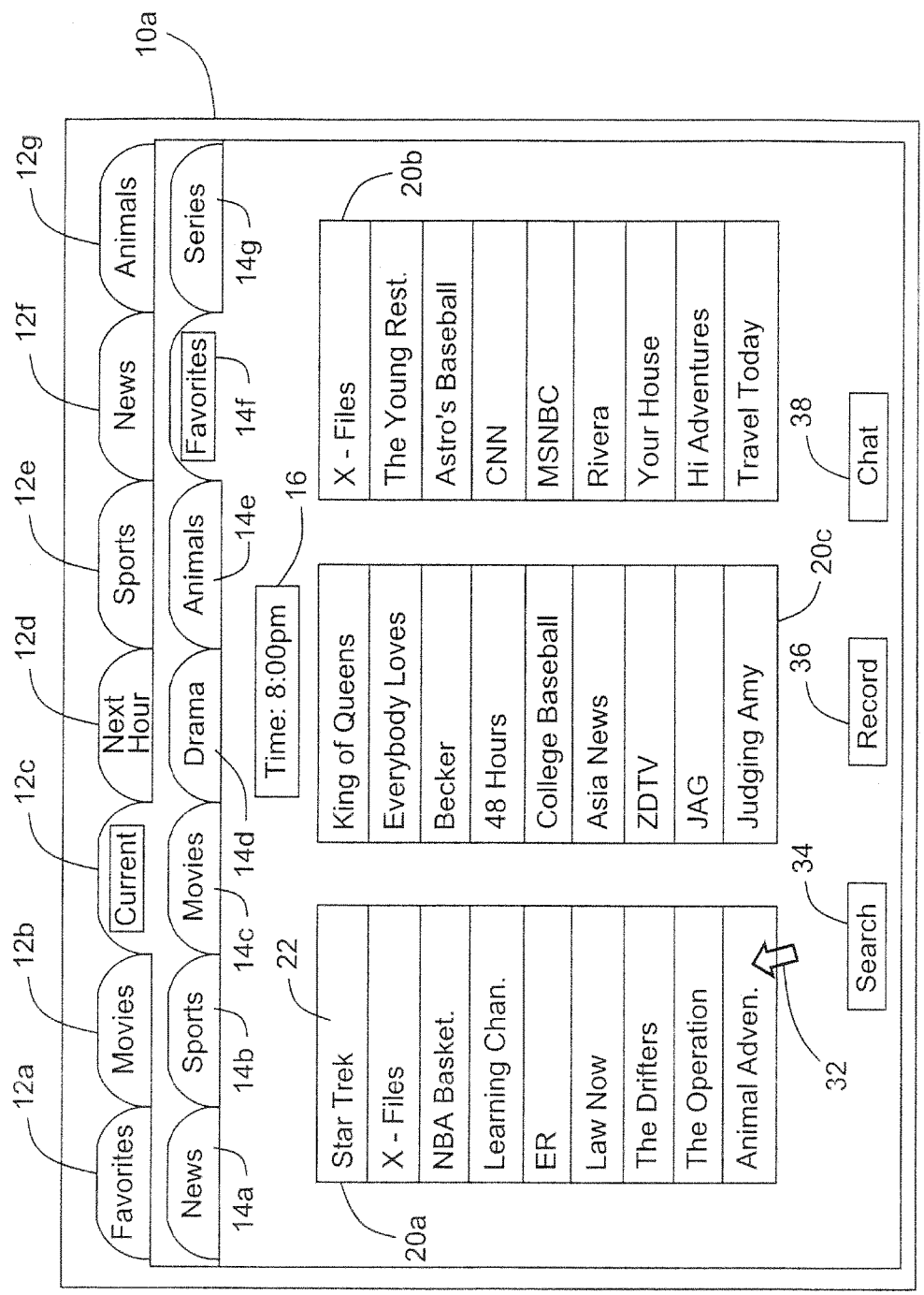
FIG. 3 is another version of a graphical user interface for an electronic content guide in accordance with one embodiment of the present invention.

Turning next to FIG. 3, a graphical user interface 10*a* displays entries 22 that satisfy the currently available category icon 12*c* and favorites subcategory 12*f*, where the number of these entries 22 exceeds the capacity of the two column display shown in FIG. 1. In this case, a three column display is automatically constructed including columns 20*a*, 20*b* and 20*c*.

While the size of the text associated with each column 20 in FIG. 3 may be unchanged from that shown in FIG. 1, the amount of information, shown in each column 20 may be decreased in one embodiment. For example, the time information may be cut off in the graphical user interface 10*a* shown in FIG. 3 to provide enough room to display, on a single display screen, all of the appropriate programs. In some embodiments, additional scrolling may be necessary to see all the available programs.

Figure 4:
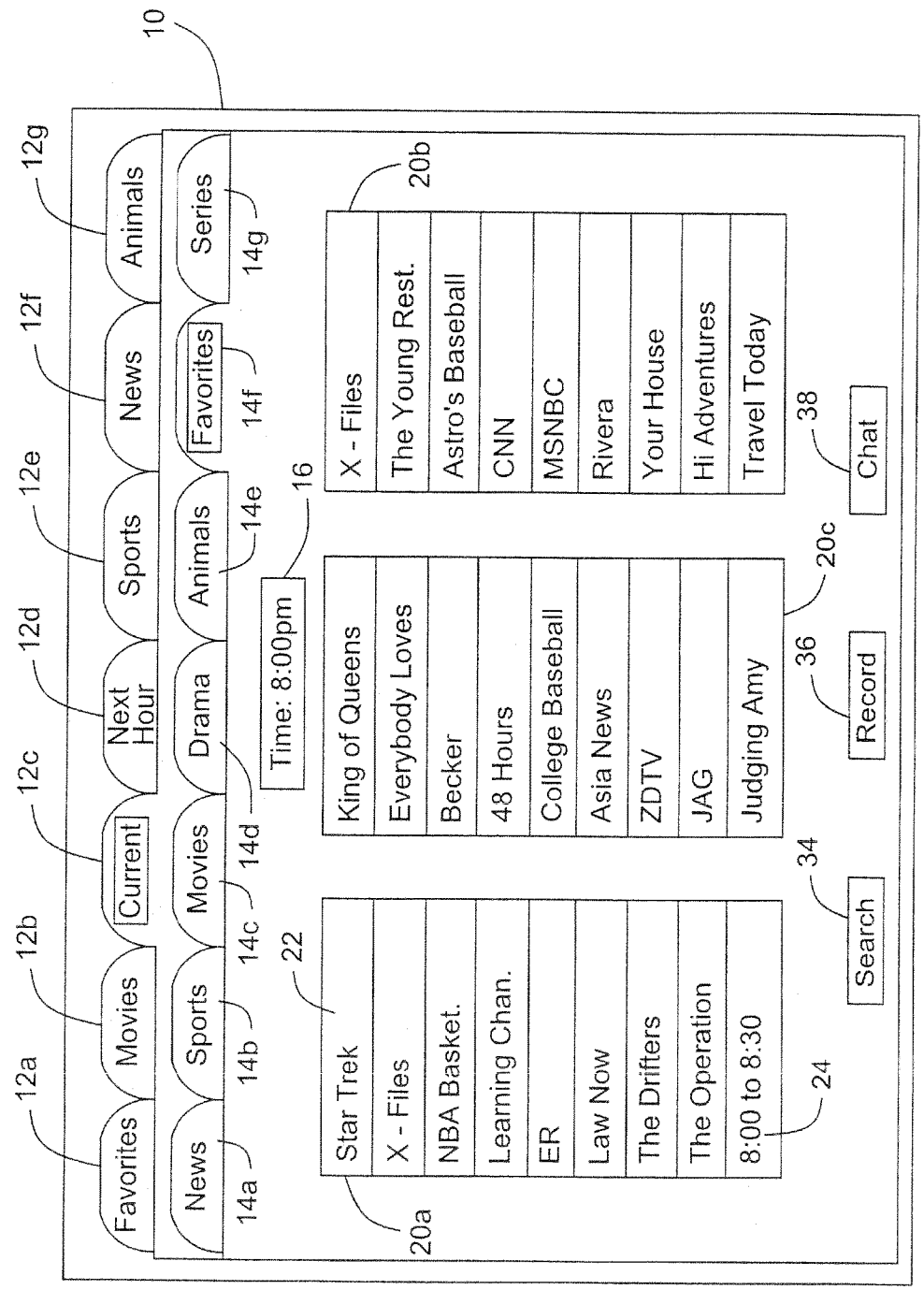
FIG. 4 is a variation of the graphical user interface shown in FIG. 3 in accordance with one embodiment of the present invention.

If the user wants additional information about a program, the user may select a particular program as indicated by the cursor 32 (on the program Animal Adventures) to cause additional information such as the time information to scroll into view as indicated at 24 in FIG. 4. Thus, additional information may be made available by scrolling the display for each entry 22.

The user can also click on the displayed entry 22 to receive the additional information, as shown in FIG. 2, through the interface 21. Thus, if the user right clicks on an entry 22, the user may get the interface 21 and if the user left mouse clicks the user gets the scrolling shown in FIG. 4, as one example. To actually select an entry 22 for viewing, the user may double click on the entry 22, in one embodiment.

Figure 5:
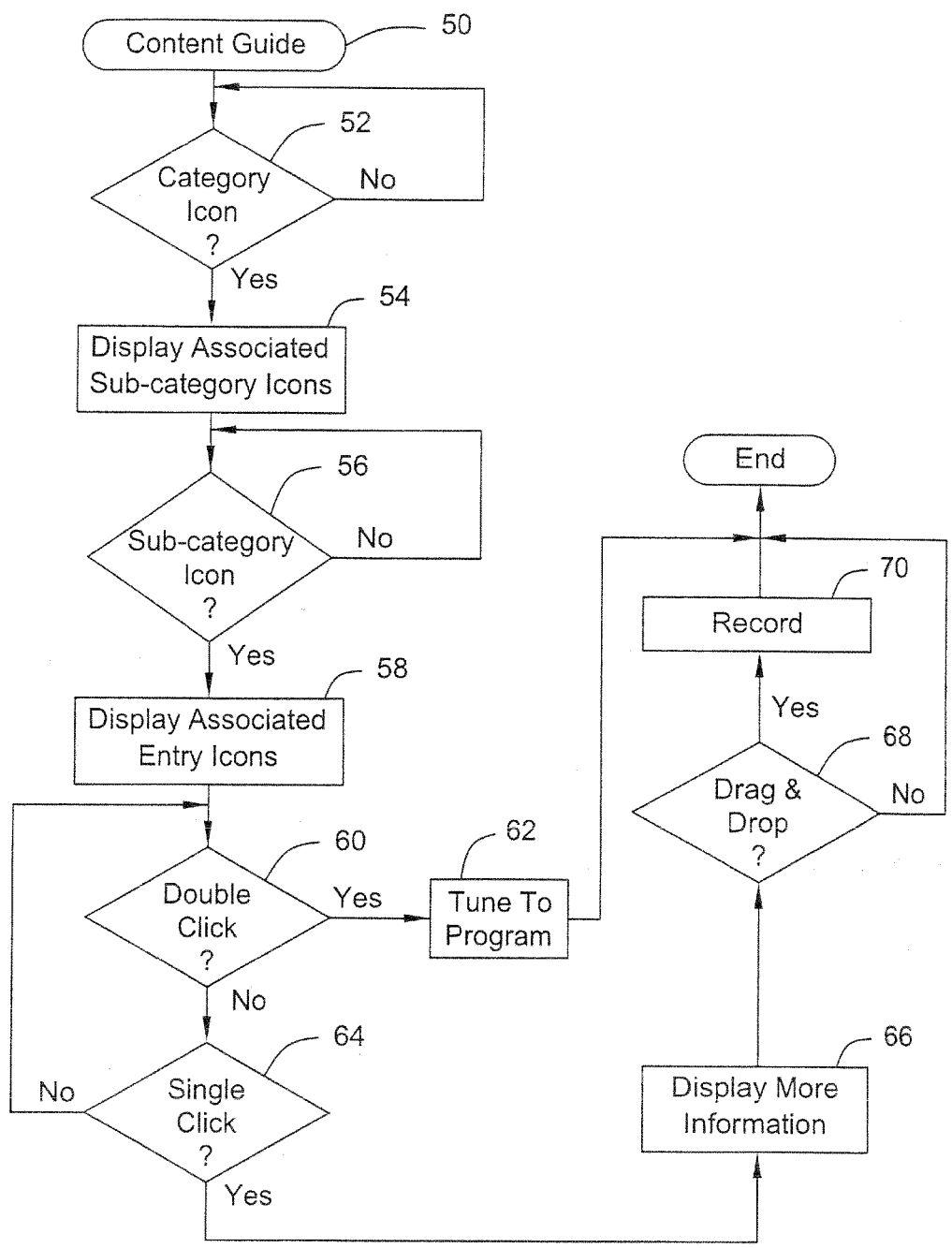
FIG. 5 is a flow chart for software in accordance with one embodiment of the present invention.

The software 50 for implementing the graphical user interface 10, in accordance with one embodiment of the present invention shown in FIG. 5, begins by determining whether a category icon 12 has been selected as indicated in diamond 52. If so, the associated subcategory icons 14 are displayed as indicated in block 54. Thus, in some cases, particular subcategory icons 14 may be associated with a given category icon 12. A check at diamond 56 determines whether one of the subcategory icons 14 has been selected. If so, associated programs 22 are displayed as indicated in block 58. A check at diamond 60 determines whether the user has double clicked on an entry 22. If so, the software 50 automatically tunes the program for viewing as indicated in block 62.

Otherwise, a check at diamond 64 determines whether a single click has occurred. If so, additional information may be displayed through the interface 21 shown in FIG. 2, for example, as indicated in block 66.

A check at diamond 68 determines whether the user has dragged and dropped a program into the record icon 36. If so, the program is automatically scheduled for recording as indicated in block 70.

Figure 6:
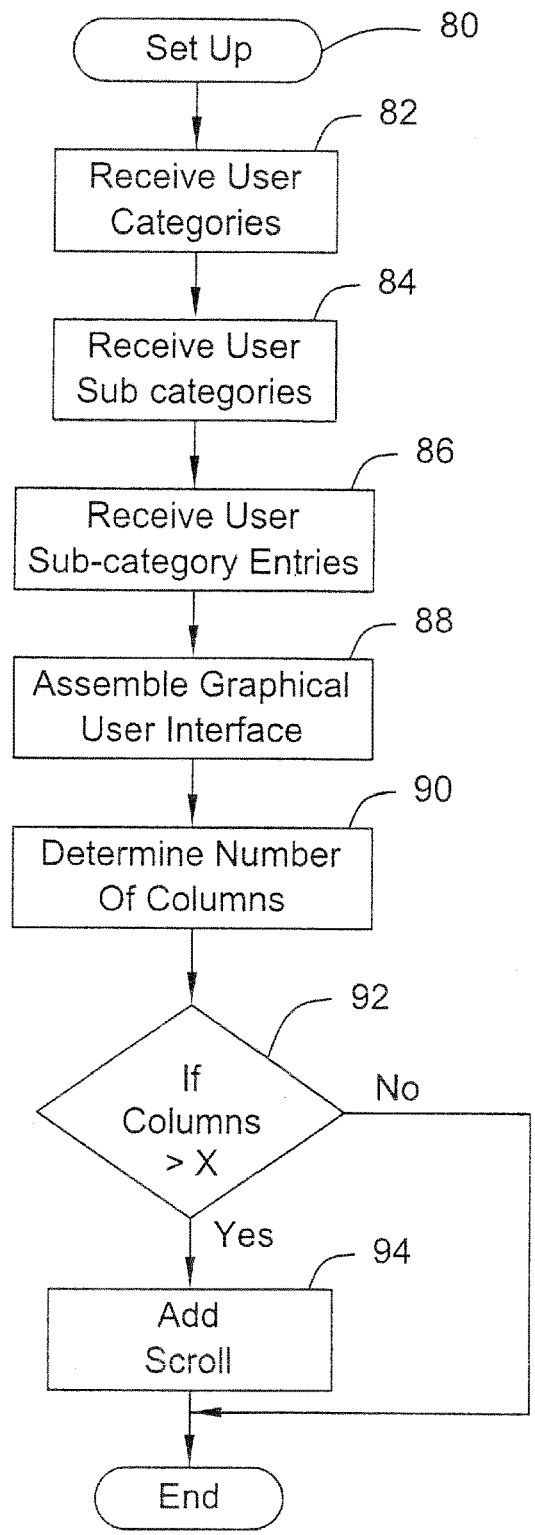
FIG. 6 is a flow chart for software in accordance with another embodiment of the present invention.

The set-up software 80, shown in FIG. 6, for setting up the electronic content guide 10 shown in FIG. 1 begins by receiving user category input listings to complete the category icons 12 as indicated in block 82. Next, the software 80 receives input data in the form of user subcategory icon entries 14 as indicated in the block 84. Thereafter, the software 80 may receive the actual entries for a given subcategory in the form of program entries 22 in one embodiment of the present invention, illustrated by block 86.

The information received in blocks 82, 84 and 86 may then be assembled into a graphical user interface (block 88). For example, depending on the number of programs that fit within a given category and subcategory, a two column graphical user interface 10 may be assembled as indicated in FIG. 1 or a three or more column interface 10*a* may be assembled as indicated in FIG. 4. In addition, the icons 12 and 14 are generated in the file folder format shown in FIG. 4 in accordance with one embodiment of the present invention.

The number of columns 20 is determined based on the number of programs that satisfy a given category and subcategory as indicated in block 90. If the number of columns is greater than a predetermined number as determined in diamond 92, the scroll feature may be provided. In such case, the amount of information displayed may be reduced from that shown in FIG. 1, for example, to the format shown in FIG. 3 where scrolling is utilized to obtain the time information. In other embodiments of the present invention, depending on the number of program entries to be displayed the size of the individual entries 22 may be reduced by making the font smaller or changing the number of entries per column.

Figure 7:
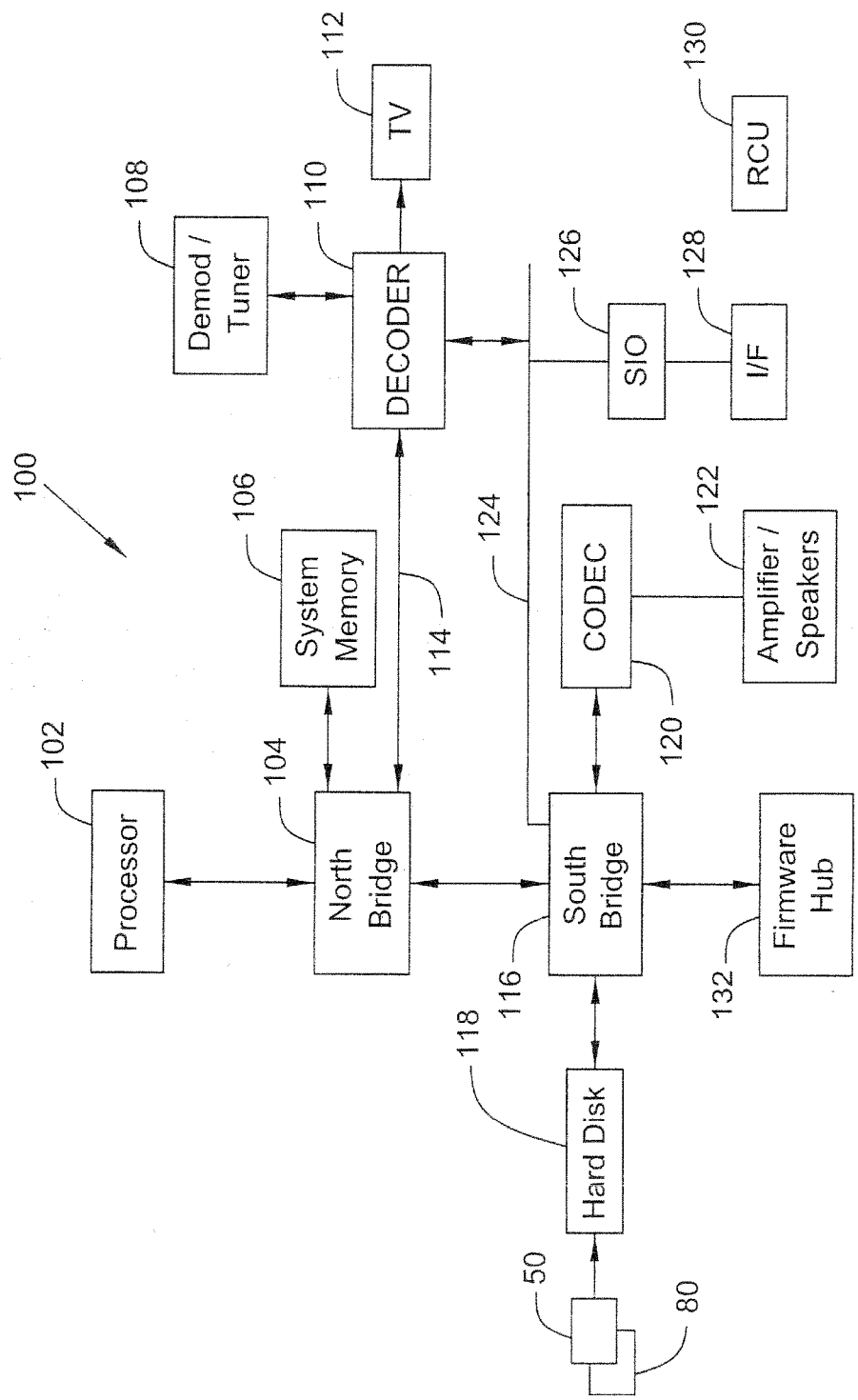
FIG. 7 is a block diagram for hardware in accordance with one embodiment of the present invention.

Turning finally to FIG. 7, a processor-based system 100 for implementing one embodiment of the present invention includes a processor 102 coupled to a north bridge 104. The system 100, for example, may be a desktop computer, a laptop computer, a handheld computer, a processor-based appliance or a set-top box as illustrated in FIG. 7.

The north bridge 104 couples a system memory 106 and a decoder 110 (via the link 114). The decoder is coupled to a demodulator/tuner 108 and may be coupled to a source of television programming such as a cable connection, the Internet or a satellite receiver. The decoder 110 is also coupled to a television receiver 112. The decoder 110 separates audio and video demodulated content and provides the video information to the north bridge 104 and the audio information to the south bridge 116 by the bus 124 in one embodiment.

The south bridge 116 communicates with the coder/decoder (codec) 120 that provides an audio output through amplifiers and speakers 122. A hard disk drive 118 is coupled to the south bridge 116 to store software programs 50 and 80. A firmware hub 132 may store basic information for operation of the system 100. The firmware hub 132 may be flash memory or other non-volatile memory in one embodiment of the present invention. The hub 132 may also store information about particular television programs which is desirable to maintain in a non-volatile memory.

A serial input/output (SIO) device 126 is coupled to an interface 128 which, in one embodiment of the present invention, is a wireless interface such as a radio or infrared interface. The interface 128 communicates with a remote control unit 130 that operates through a compatible interface.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computer system capable of being used in association with a television and a remote control, the computer system comprising:

a wireless communication interface capable of permitting, when the computer system is in operation, wireless communication between the computer system and a remote control;

a processor to execute program instructions that, when executed, result in performance of operations comprising:

displaying, on the television, a graphical user interface comprising an electronic programming guide that is capable of presenting, in response to user input, user selectable icons and related information associated, at least in part, with video content items that are capable of being selected, via the graphical user interface, for viewing on the television, the video content items to be received, at least in part, by the computer system via Internet;

the icons comprising video content category icons, a search icon, and a chat icon;

the category icons being associated with one or more respective selectable video content subcategory icons whose selection results in display of one or more associated selectable video content item icons;

the search icon being to facilitate keyword searching for available video content items, the available video content items including at least one video content item associated with currently ongoing video content;

the chat icon being capable of being selected, after the at least one video content item has been selected for display, to permit chatting related to the at least one video content item;

wherein:

the computer system is capable, when the computer system is in the operation, of receiving user-entered information indicating that a user of the computer system has decided that certain video content is to be categorized as being in favorite video content categorization as defined by the user;

the favorite video content categorization is to be associated with another icon that, when selected by the user when the computer system is in the operation, results in displaying, via the graphical user interface, of favorite video content item icons that have been categorized as being in the favorite video content categorization;

the favorite video content item icons are configurable to include at least one favorite video content item icon and at least one other favorite video content item icon;

the at least one favorite video content item icon is associated with other video content that is not yet available for viewing; and the at least one other favorite video content item icon is associated with broadcast news video content that is currently available for viewing;

wherein the at least one favorite video content item icon and the at least one other favorite video content item icon are configurable to be displayed in separate categorizations.

2. The computer system of claim 1, wherein the computer system is comprised in one of:

a set-top box;
a handheld computer;
a processor-based appliance.

3. The computer system of claim 1, wherein the computer system comprises:

program storage that stores the program instructions; and
the program storage comprises flash memory firmware.

4. The computer system of claim 1, wherein:

the computer system is capable of being coupled to the television.

5. The computer system of claim 1, wherein:

the graphical user interface is capable of displaying a video thumbnail depiction of a currently displayed frame of the at least one video content item.

6. The computer system of claim 1, wherein:
the graphical user interface is capable of indicating video content user favorability and viewing frequency information.

7. One or more non-transitory computer-readable media storing instructions for use by a computer system, the computer system being capable of being used in association with a television and a remote control, the instructions when executed by the computer system resulting in performance of operations comprising:
permitting establishment of wireless communication between a wireless communication interface of the computer system and the remote control;
displaying, on the television, a graphical user interface comprising an electronic programming guide that is capable of presenting, in response to user input, user selectable icons and related information associated, at least in part, with video content items that are capable of being selected, via the graphical user interface, for viewing on the television, the video content items to be received, at least in part, by the computer system via Internet;
the icons comprising video content category icons, a search icon, and a chat icon;
the category icons being associated with one or more respective selectable video content subcategory icons whose selection results in display of one or more associated selectable video content item icons;
the search icon being to facilitate keyword searching for available video content items, the available video content items including at least one video content item associated with currently ongoing video content;
the chat icon being capable of being selected, after the at least one video content item has been selected for display, to permit chatting related to the at least one video content item;
wherein:
the computer system is capable, when the computer system is in the operation, of receiving user-entered information indicating that a user of the computer system has decided that certain video content is to be categorized as being in favorite video content categorization as defined by the user;
the favorite video content categorization is to be associated with another icon that, when selected by the user when the computer system is in the operation, results in displaying, via the graphical user interface, of favorite video content item icons that have been categorized as being in the favorite video content categorization;
the favorite video content item icons are configurable to include at least one favorite video content item icon and at least one other favorite video content item icon;
the at least one favorite video content item icon is associated with other video content that is not yet available for viewing; and
the at least one other favorite video content item icon is associated with broadcast news video content that is currently available for viewing;
wherein the at least one favorite video content item icon and the at least one other favorite video content item icon are configurable to be displayed in separate categorizations.

8. The one or more computer-readable media of claim 7, wherein the computer system is comprised in one of:
a set-top box;
a handheld computer;
a processor-based appliance.

9. The one or more computer-readable media of claim 7, wherein the computer system comprises:
program storage that stores the program instructions; and
the program storage comprises flash memory firmware.

10. The one or more computer-readable media of claim 7, wherein:
the computer system is capable of being coupled to the television.

11. The one or more computer-readable media of claim 7, wherein:
the graphical user interface is capable of displaying a video thumbnail depiction of a currently displayed frame of the at least one video content item.

12. The one or more computer-readable media of claim 7, wherein:
the graphical user interface is capable of indicating video content user favorability and viewing frequency information.

* * * * *